Aug. 11, 1936.  H. T. BOOTH  2,050,242
VISCOSIMETER
Filed Feb. 7, 1933
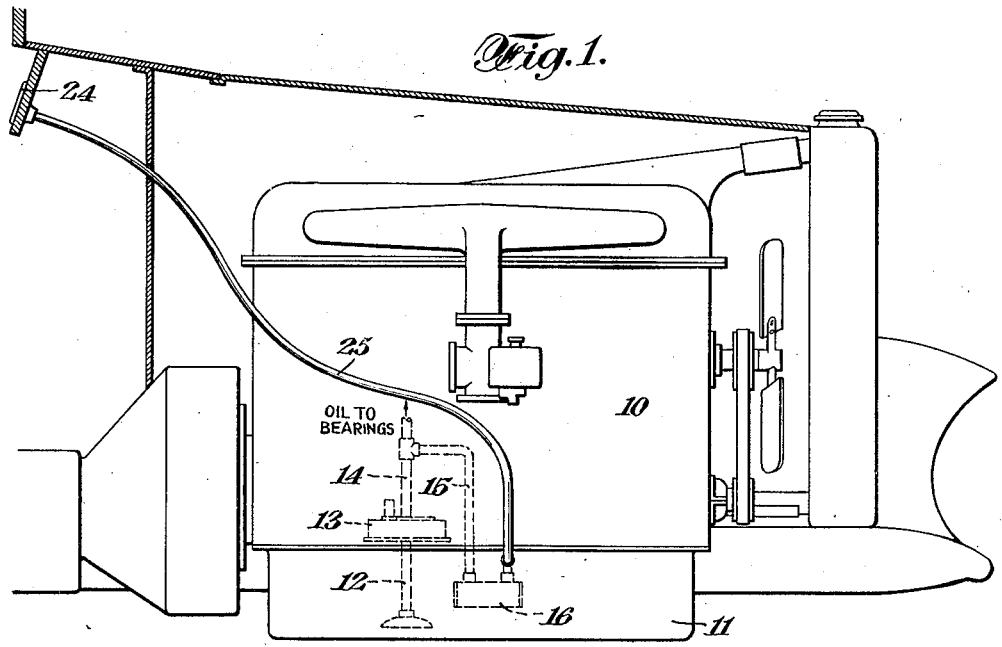
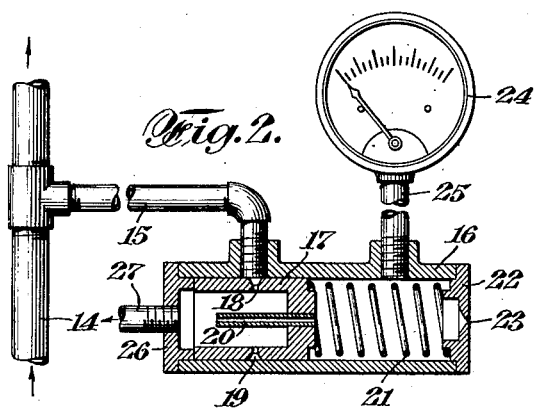
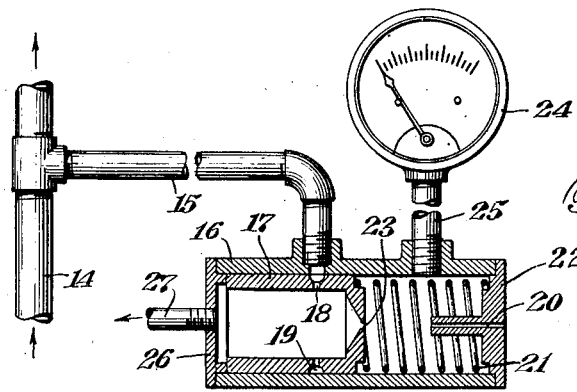
INVENTOR
Harry T. Booth
BY Kenyon & Kenyon
ATTORNEYS.

Patented Aug. 11, 1936

2,050,242

UNITED STATES PATENT OFFICE 2,050,242

VISCOSIMETER

Harry T. Booth, Detroit, Mich., assignor to Lubrication Control Corporation, Chicago, Ill., a corporation of Delaware Application February 7, 1933, Serial No. 655,578

8 Claims. (Cl. 265—11)

This invention relates to viscosimeters and has for an object a simple and efficient device for measuring and registering the viscosity of fluid flowing therethrough.

In a device embodying the invention, the fluid is caused to pass successively through two ports, one comprising a friction tube, the resistance of which to fluid flow varies with the viscosity of the fluid and the other port comprising an orifice, the resistance of which to fluid flow is substantially independent of the viscosity of the fluid, these ports being arranged in either of two orders of succession. Means are provided for maintaining constant pressure differential across the first port and the pressure of the fluid between the two ports or the pressure of the fluid supplied to the first port is applied to a pressure responsive indicator suitably calibrated to give direct viscosity readings. The pressure of the fluid between the two ports and also the pressure of the fluid supplied to the first port is a function of the viscosity of the fluid and the indicator reacts to changes in viscosity of the fluid.

Other objects, novel features and advantages of this invention will be apparent from the following specification and accompanying drawing, wherein:

Fig. 1 is a side elevation of an automobile engine having its lubricating system equipped with a viscosimeter embodying the invention;

Fig. 2 is an enlarged vertical central section of the preferred embodiment of the invention, and Fig. 3 is a similar view of a modification of the invention.

The internal combustion engine 10 is provided with an oil pan 11 from which a pipe 12 leads to the inlet port of a pump 13. A pipe 14 leads from the outlet port of the pump 13 to the engine bearings (not shown). The pump draws oil from the pan 11 and delivers the oil to the bearings in the well-known manner. A relief valve may be connected to the pipe 14 in order to prevent the oil pressure in the pipe 14 from exceeding a predetermined maximum.

A pipe 15 leads from the pipe 14 to one end of a casing 16 arranged in the upper part of the oil pan 11. A skirted piston 17 is slidably mounted in the casing 16 and the skirt is provided with radial ports 18 which communicate with a peripheral groove 19 in the outer face of the skirt. The position of this piston with respect to the pipe 15 controls the flow of oil through said pipe into the interior of the piston. The piston 17 is provided with a friction tube 20 which extends through the head of the piston and delivers oil from one side of the piston to the other. A spring 21 is interposed between the piston 17 and the plug 22, closing the right end of the casing 17. An orifice 23 in the plug 22 provides a port for escape of oil from the casing into the oil pan 11, the rate of flow through the orifice being the same as through the friction tube. A pressure responsive indicator or gauge 24 is connected through the pipe 25 with the space between the piston 17 and the plug 22. The indicator 24 may instead be connected to the space between the piston 17 and the plug 26 closing the left end of the casing 17, the pipe 27 being provided for the purpose of making this connection.

The friction tube 20 is of such dimensions that its resistance to fluid flow varies with the viscosity of the fluid while the orifice 23 is of such dimensions that its resistance to fluid flow is substantially independent of the viscosity of the fluid, and as will later be described, the pressure differential across the friction tube is maintained substantially constant irrespective of the pressure of the oil flowing through the pipe 15. Since the pressure differential across the friction tube is maintained substantially constant, the rate of flow through the friction tube varies inversely with viscosity and as the resistance to flow of the orifice is dependent upon rate of flow and is substantially independent of viscosity and as the rate of flow through the orifice is the same as through the friction tube, the pressure of the oil in the space between the piston 17 and the plug 22 is a measure of the rate of flow through the friction tube and is a function of the oil viscosity. The pressure of the oil in the space between the piston 17 and the plug 26 always bears a fixed relation to the pressure of the oil in the space between the piston 17 and the plug 22, and, therefore, the pressure of the oil between the piston 17 and the plug 26 is also a function of the oil viscosity. The readings of the indicator or gauge 24 are thus indications of the fluid viscosity and with suitably calibrated gauges, direct viscosity readings may be obtained.

Constant pressure differential across the friction tube 20 is maintained by regulatory movement of the piston 17. When the engine it at rest, the piston 17 is in the position shown in Fig. 2 with the peripheral groove 19 in full register with the pipe 15. When the engine is in operation, oil is forced through the pipe 15 into the piston 17, tending to move it to the right against the action of the spring 21, thereby decreasing oil flow into the piston and correspondingly decreasing the pressure applied to the piston. Such movement continues until the pressure differential across the friction tube 20 equals the strength of the spring 21 and such relationship is maintained by regulatory movement of the piston back and forth independently of the pressure of the oil flowing in the pipe 15.

In the event of an increase of pressure in the pipe 15 without change of viscosity, there will be an initial increase of pressure on the left hand side of the piston 17 which will cause movement thereof to the right with consequent reduction in the effective area of the cooperating ports in the casing and piston skirt. The rate of flow into the piston will be decreased until the ratio between the flow into the piston and the flow out of the outlet 23 is such that the predetermined pressure differential across the inlet port in the piston head is again obtained. There will be no substantial change of pressure in the piston 17 as any tendency for pressure increase is nullified by movement of the piston to reduce the rate of flow. Whatever pressure increase may take place in the piston is immediately nullified and a constant differential is maintained between the pressure in the piston and the pressure between the friction tube and orifice. With constant viscosity, the pressure differential across the inlet port will remain constant and therefore any tendency toward pressure increase in the piston results in a tendency to increase the pressure differential across the inlet port with consequent compression of the spring 21 and decrease in the effective area of the coacting ports in the casing and piston skirt. Therefore, the pressure in the piston will be maintained substantially constant with constant viscosity, even though the pressure in the pipe 15 may be substantially increased.

The modification disclosed in Fig. 3 differs from the modification disclosed in Fig. 2 in that the piston 17 is provided with an orifice 23, while the plug 22 is provided with a friction tube 20. Constant pressure differential is maintained across the orifice 23 by regulatory movement of the piston 17 and the rate of flow through the orifice is maintained substantially constant. As the rate of flow through the orifice 23 and the friction tube 20 is the same, and as the resistance of the friction tube 20 varies with viscosity, it follows that the pressure required to flow the oil through the friction tube 20 varies with the viscosity of the oil. Since the rate of flow through the orifice is substantially independent of viscosity, the pressure in the space between the piston 17 and the plug 22 is a measure of the rate of flow and is a function of the oil viscosity.

The pressure between the piston 17 and the plug 26 is likewise a function of the viscosity and direct viscosity readings are obtainable through the medium of the pressure responsive indicator 24 which may be connected either through the pipe 25 or the pipe 27 for registering these pressures.

In each of the modifications above described, the space between the friction tube and the orifice constitutes a chamber having an inlet port comprising either the friction tube or orifice and an outlet port comprising either the orifice or the friction tube. The pressure of the oil in this chamber is a function of the viscosity of the oil and is utilized to produce direct viscosity readings by means of the indicator 24. In the modifications disclosed in Figs. 2 and 3, pressure increase between the friction tube and orifice is indicative of viscosity decrease and vice versa, while in the modification disclosed in Fig. 4, pressure increase between the orifice and friction tube is indicative of viscosity increase and vice versa. In all the modifications, one wall of the chamber is movable in response to pressure changes in the chamber to control the flow of oil to the inlet port to maintain constant pressure differential across the port. Also, a chamber is provided ahead of the first port and the pressure of this chamber is a function of the oil viscosity as such pressure bears a constant relation to the pressure of the oil between the friction tube and orifice.

It is of course understood that various modifications may be made in the structure above described without in any way departing from the spirit of the invention as defined in the appended claims.

I claim:

1. In a viscosimeter, an integral cylindrical casing, a skirted piston slidably mounted in said casing, a friction tube extending through the head of the piston, said piston skirt and casing having cooperating ports for flowing fluid into the piston, a spring tending to oppose movement of the piston in one direction, an outlet orifice from said casing, and a pressure responsive viscosity indicator connected to said casing and responsive to fluid pressure between said friction tube and orifice.

2. In a viscosimeter, an integral cylindrical casing, a skirted piston slidably mounted in said casing, said piston having an orifice in its head, said piston skirt and casing having cooperating ports for flowing fluid into the piston, a spring tending to oppose movement of the piston in one direction, a friction tube through which fluid is discharged from said casing, and a pressure responsive viscosity indicator connected to said casing and responsive to the fluid pressure between said orifice and friction tube.

3. In a viscosimeter, an integral cylindrical casing, a skirted piston slidably mounted in said casing, a friction tube extending through the head of the piston, said piston skirt and casing having cooperating ports for flowing fluid into the piston, a spring tending to oppose movement of the piston in one direction, an outlet orifice from said casing, and a pressure responsive viscosity indicator connected to said casing and responsive to the fluid pressure immediately in advance of said friction tube.

4. In a viscosimeter, an integral cylindrical casing, a skirted piston slidably mounted in said casing, said piston skirt and casing having cooperating ports for flowing fluid into the piston, a spring tending to oppose movement of the piston in one direction, said piston having an inlet port therethrough and said casing having an outlet port, and a pressure responsive viscosity indicator connected to said casing for operation upon by fluid pressure between said ports, one of said two last-named ports comprising a friction tube and the other port comprising an orifice.

5. In a viscosimeter, a casing, a skirted piston slidably mounted in said casing, said piston skirt and casing having cooperating ports for flowing fluid into the piston, a spring tending to oppose movement of the piston in one direction, said piston having an inlet port therethrough and said casing having an outlet port, and a pressure-responsive viscosity indicator connected to said casing for operation upon by the fluid pressure immediately ahead of said inlet port, one of said two last-named ports comprising a friction tube and the other port comprising an orifice.

6. In a viscosimeter, an integral casing having inlet and outlet ports, a piston movable in said casing and adapted to bodily close said inlet port to control flow therethrough, resilient means tending to move said piston in one direction, said piston being provided with an intermediate port and being movable by fluid flowing into said casing to maintain constant pressure differential across said intermediate port, and a pressure responsive viscosity indicator connected to said casing for operation upon by the fluid pressure immediately adjacent one side of said intermediate port, one of said intermediate and outlet ports comprising a friction tube and the other comprising an orifice.

7. In a viscosimeter, an integral casing having inlet and outlet ports, a piston movable in said casing and adapted to bodily close said inlet port to control flow therethrough, resilient means tending to move said piston in one direction, said piston being provided with an intermediate port and being movable by fluid flowing into said casing to maintain constant pressure differential across said intermediate port, and a pressure responsive viscosity indicator connected to said casing for operation upon by the fluid pressure immediately adjacent one side of said intermediate port, said intermediate port comprising a friction tube and said outlet port comprising an orifice.

8. In a viscosimeter, an integral casing having inlet and outlet ports, a piston movable in said casing and adapted to bodily close said inlet port to control flow therethrough, resilient means tending to move said piston in one direction, said piston being provided with an intermediate port and being movable by fluid flowing into said casing to maintain constant pressure differential across said intermediate port, and a pressure responsive viscosity indicator connected to said casing for operation upon by the fluid pressure immediately adjacent one side of said intermediate port, said intermediate port comprising an orifice and said outlet port comprising a friction tube.

HARRY T. BOOTH.